(12) United States Patent
Tanaka et al.

(10) Patent No.: US 6,298,355 B1
(45) Date of Patent: Oct. 2, 2001

(54) COMPUTER SYSTEM

(75) Inventors: Teruo Tanaka; Tadayuki Sakakibara, both of Hadano; Hiromitsu Maeda, Yamato, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/269,023

(22) PCT Filed: Sep. 20, 1996

(86) PCT No.: PCT/JP96/02719

§ 371 Date: Mar. 18, 1999

§ 102(e) Date: Mar. 18, 1999

(87) PCT Pub. No.: WO98/12639

PCT Pub. Date: Mar. 26, 1998

(51) Int. Cl.[7] .................................................. G06F 17/00
(52) U.S. Cl. ..................... 707/200; 709/200; 711/100; 711/200; 711/202
(58) Field of Search .................. 707/1–10, 200–206; 711/200–202, 100–138, 170; 709/200, 264

(56) References Cited

U.S. PATENT DOCUMENTS

| | | | | |
|---|---|---|---|---|
| 5,369,749 | * | 11/1994 | Baker et al. ........................... | 709/104 |
| 5,369,767 | * | 11/1994 | Dinwiddie et al. ................... | 710/264 |
| 5,606,688 | * | 2/1997 | McNutt et al. ....................... | 711/170 |
| 5,619,677 | * | 4/1997 | Nishimukai et al. ................ | 711/138 |

FOREIGN PATENT DOCUMENTS

| | | | |
|---|---|---|---|
| 59-54091 | * | 3/1984 | (JP) . |
| 4-170648 | * | 6/1992 | (JP) . |
| 3-182945 | * | 8/1992 | (JP) . |

OTHER PUBLICATIONS

Givargis et al., "Instruction–baed system–level power evaluation of system–on–a–chip peripheral cores", System Synthesis, 2000. Proceedings. The 13th International Symposium on. pp. 163–169, Sep. 2000.*

Kim et al., "A hierarchical location management architecture for wireless ATM Networks", Global Telecommunications Conference, 1999 pp. 251–258, vol. 1a, Dec. 1999.*

Mombers et al., "A multithreaded Multimedia Processor Merging On–Chip Multiprocessors and Distributed Vector Pipelines", 1999, ISCAS '99, Proceeding 1999 IEEE International Symposium on, pp. 287–290, vol. 4, Sept. 2000.*

* cited by examiner

Primary Examiner—Thomas Black
Assistant Examiner—David Jung
(74) Attorney, Agent, or Firm—Mattingly, Stanger & Malur, P.C.

(57) ABSTRACT

A storage control unit of a computer system in which main storage is shared between one through a plurality of processors, is provided with transfer control means for holding therein address information in a first area of the main storage, in which desired data specified by an arbitrary processor is stored, address information in a second area of the main storage device, to which the desired data is to be transferred, and information about the length of the desired data, and transfer means for reading the data stored in the first area and storing the data in the second area under the control of the transfer control means.

Owing to these configurations, the storage control unit is capable of executing a copy of data from the first area to the second area separately from the processors according to instructions from each processor. Thus, the load on each processor can be reduced. Since a processor bus may be unused in data copying when the plurality of processors are connected to the processor bus, the load on the processor bus can be greatly reduced.

18 Claims, 7 Drawing Sheets

COMPUTER SYSTEM

TECHNICAL FIELD

The present invention relates to a computer system capable of executing a process for copying data on the main storage independently of the operation of a processor.

BACKGROUND ART

In systems, so-called open systems in which software interfaces are unified between pieces of different hardware, most of them have recently been configured so that RISC processors are connected to one another by one through a plurality of buses.

In a certain type of operating system (OS) conventionally widely used in such open systems, pages expressed in units of, for example, 512 Bytes (hereinafter called "B") or 4096B are handled as one file to simplify a user interface. Therefore, the transfer of data between an IO buffer area and a user area prepared for the OS increases. Further, the scale of a middle application increases because of a leap increase in the capacities of a disk and a memory. For example, a database process has necessitated the transfer of large amounts of data ranging from a few KB to a few MB on main storage. The transfer of large amounts of continuous data on the main storage will hereinafter be called a "data copy on main storage".

When the data copy on such main storage is performed, the efficiency of reuse of the data is low and hence a cache effect is hardly obtained.

FIG. 1 shows a basic configuration of such an open system.

In FIG. 1, the computer system comprises processors 1 and 2, caches 3 and 4 placed in the respective processors, a processor bus 5, a storage control unit 6, main storage bunk-buses 7 to 10, and main storage banks 11 to 14.

When the processors 1 and 2 are set as those of RISC architecture, a register-to-register arithmetic operation is fundamental and all the data accesses to main storage are executed as the transfer of data between registers and the main storage.

The processors 1 and 2 are electrically connected to the processor bus 5. The processors 1 and 2 are provided with the caches 3 and 4 respectively. Thus, the number of accesses to the main storage is reduced to hold the availability of the processor bus 5 low. The caches are implemented by incorporating them into the processors, providing them outside the processors or connecting both to each other in hierarchical form. Further, a plurality of processors are improved in efficiency owing to a high-speed sequence assurance mechanism for data between the processors, which is called a "snoop mechanism".

With respect to the main storage, particularly, main storage employed in a system having a plurality of processors, the capability (corresponding to the total band width of the main storage bank-buses 7 to 10) of supply of data from main storage is normally designed so as to have the capability corresponding to one to two times the ability (corresponding to a band width of the processor bus 5) to make a request for data from each processor. Therefore, the capability of supply of the data from the main storage is ensured by dividing the main storage into a plurality of banks and interleaving addresses.

In the system shown in FIG. 1, a data copy on the main storage is implemented by the following procedures.

(1) Data is first fetched from the main storage banks 11 to 14 to a register (not shown) on the processor 1 through the processor bus 5 and the cache 3 in accordance with a load instruction from the processor 1.

(2) Next, the data on the register is stored at specified addresses of the main storage banks 11 to 14 in accordance with a store instruction from the processor.

(3) The above processing is repeatedly performed on the required amount of data.

Accordingly, the data is shifted alternately to and from the processor bus 5 without being almost processed. Incidentally, the features about the transfer of the data in such main storage are generally as follows:

(1) Continuous data (2) large amounts of data ranging from 4 KB to a few MB (3) No data is processed during data transfer, for example.

(4) It is of importance to an application handling massive scale data like a database that a data group aligned in page units of 4 KB is copied onto areas aligned in different page units of 4 KB.

In the aforementioned prior art, the data copy on the main storage is implemented by repeatedly executing the load instruction and the store instruction issued from the processor. Therefore, (1) The data copy on the main storage makes up a considerable operation time for the processor.

When the prior art is taken as a system, a bottleneck in the performance assumes the processor bus. Therefore, (2) Even though there is a possibility that the data copy on the main storage is basically continuous and all the main storage bank-buses can be activated, play will be produced in each main storage bank-bus.

(3) When a plurality of processors are connected to the processor bus, the availability of the processor bus increases due to the data copy on the main storage by one processor, thus leading up to delays in access to the main storage by other processors.

Thus, an object of the present invention is to provide a computer system capable of executing a data copy on main storage with efficiency in asynchronism with and independently of the operation of each of processors. Even when a plurality of processors are connected to a processor bus, a data copy on the main storage by an arbitrary processor can be executed without delaying access to the main storage by other processors.

DISCLOSURE OF THE INVENTION

In order to achieve the above object, the present invention provides a computer system, comprising at least one processor, a main storage device, and a storage control unit for controlling access from the processor to the main storage device, the storage control unit including transfer control means for holding therein address information in a first area of the main storage device, in which desired data specified by the processor is stored, address information in a second area of the main storage device, to which the desired data is to be transferred, and information about the length of the desired data, and transfer means for reading the desired data stored in the first area and storing the data in the second area under the control of the transfer control means. The storage control unit executes the transfer of data from the first area to the second area independently of the processor according to instructions issued from the processor. The transfer control means determines whether the data transfer is completed and reports the completion of the data transfer to the processor when it is determined that the data transfer has been completed.

According to the present invention, since a data copy on the main storage can be executed in asynchronism with and independently of the processing of each processor, the load on the processor can be reduced. Since a processor bus may be unused in a data copy when a plurality of processors are connected to the processor bus, the load on the processor bus can be greatly reduced.

BEST MODE FOR CARRYING OUT THE INVENTION

A preferred embodiment of the present invention will hereinafter be described with reference to the accompanying drawings.

Figure 1:
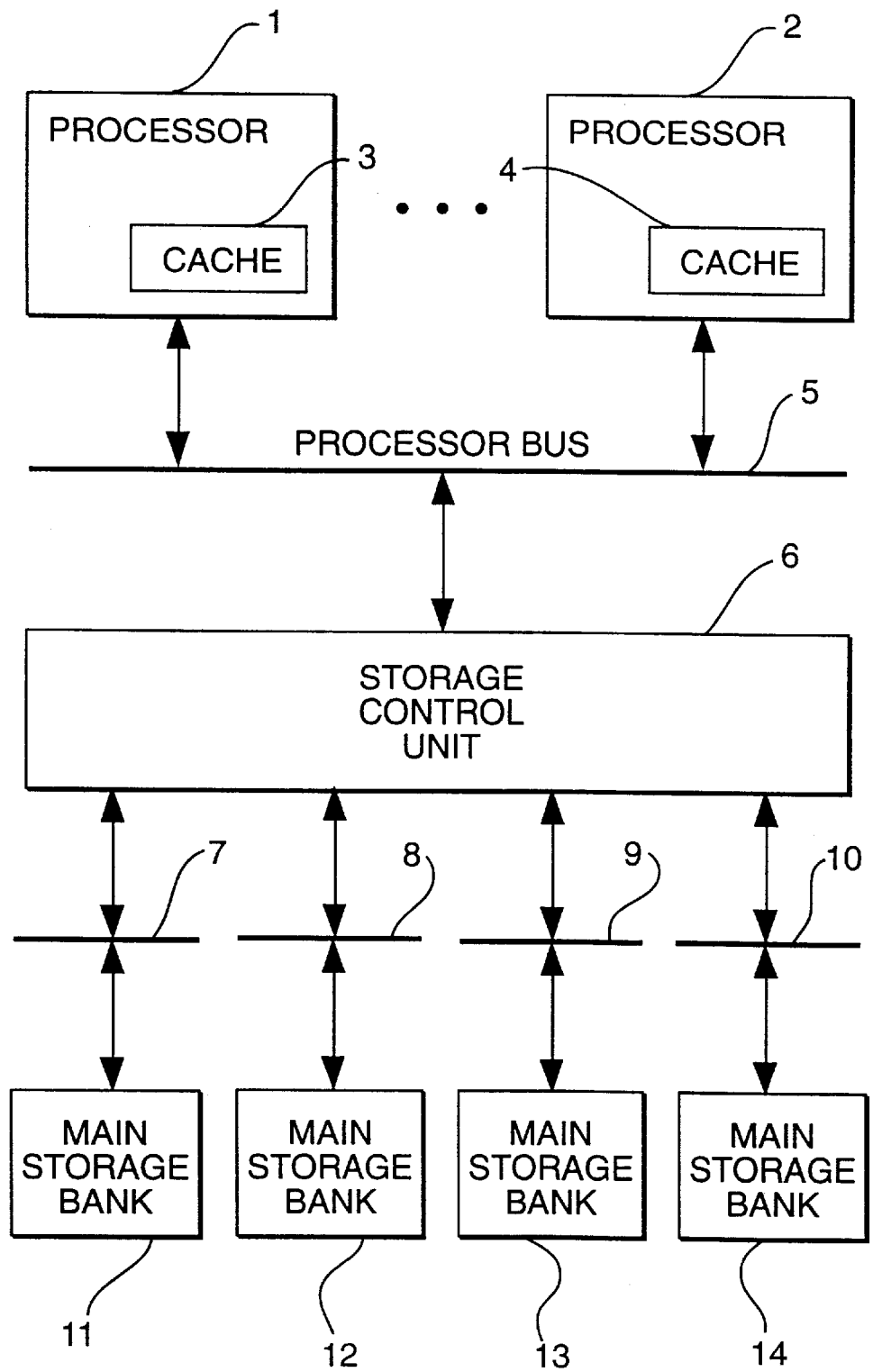
FIG. 1 is a diagram showing a basic configuration of a computer system.

In the present embodiment, a computer system will take a configuration shown in FIG. 1. For simplicity of illustration, a plurality of processors are provided and the respective processors include store-in type (write-back type) caches respectively, which will be defined as provided with snoop mechanisms respectively. Now, three states of [change] (the contents of data has been changed. It does not coincide with the contents of main storage or memory), [occupy] (data exists on a cache but is not yet changed) and [Invalid] (information about the corresponding address does not exist on a cache) will be defined as the state of data within each cache for implementing snoop processing.

An address space will be defined with 4 KB as a page unit. The unit of data will be defined as 8 bytes. The main storage or memory takes an interleaved configuration and the number of banks will be defined as 4. Further, data widths of respective main storage banks will be defined as 8 bytes respectively. Of course, the snoop mechanisms, interleaved configuration of main storage, bank configurations, etc. can take various forms. However, the present invention can be applied even to any configurations.

A first embodiment of the present invention will be described in detail with reference to FIGS. 2 through 5.

As to the procedure of description, the first embodiment using processors and a processor bus will be explained with reference to FIGS. 2 and 3, and correspondingly the first embodiment using a storage control unit will be explained with reference to FIGS. 4 and 5.

Figure 2:
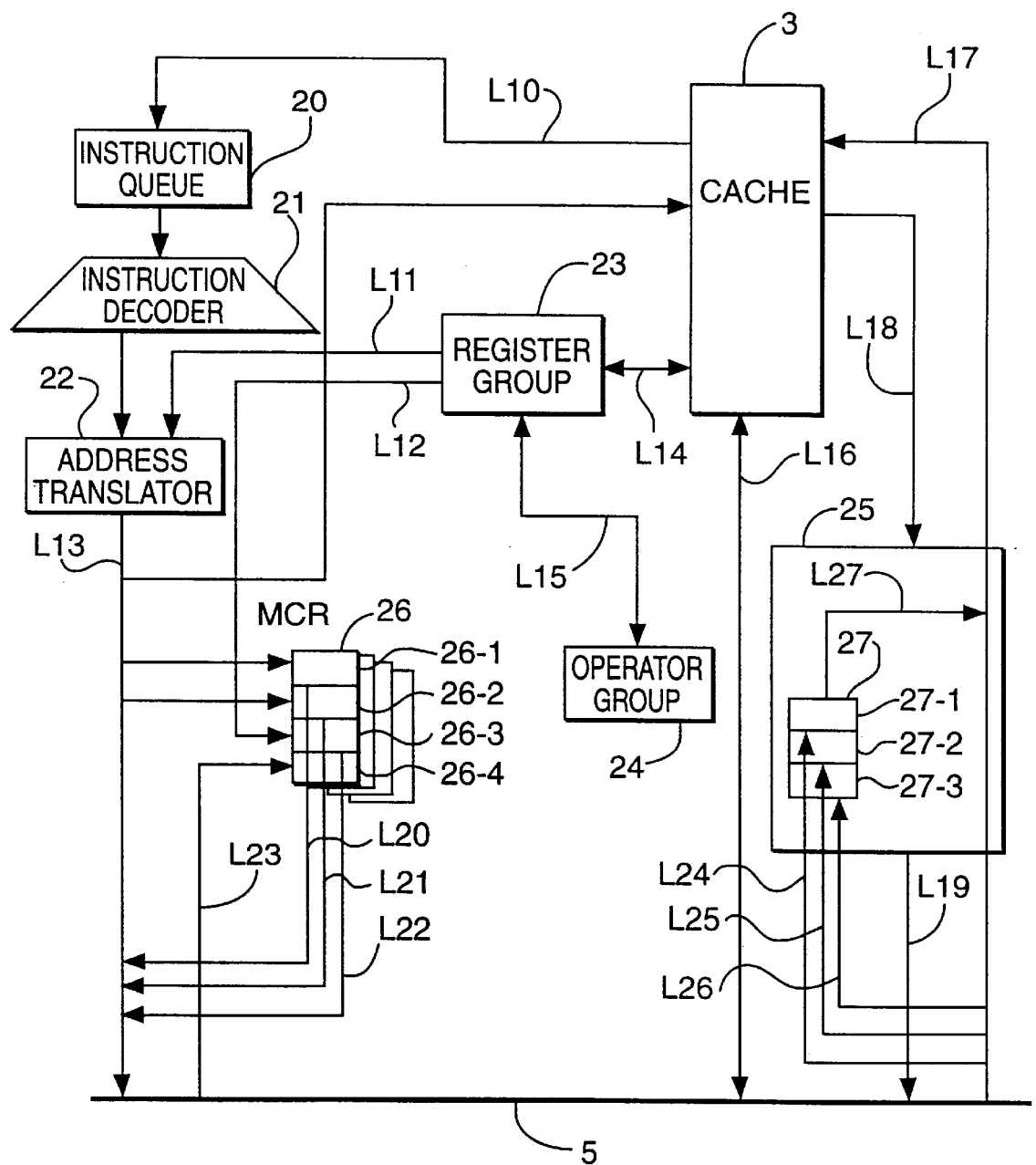
FIG. 2 is a diagram illustrating a configuration of a processor employed in a first embodiment of the present invention.

FIG. 2 shows a configuration of a processor shown in FIG. 1. Respective processors 1 and 2 are similar in configuration to each other.

In FIG. 2, a processor 1 comprises an instruction queue 20, an instruction decoder 21, an address translator 22, a register group 23, an operator group 24, an address generator 25 for snoop processing, corresponding to the novel mechanism of the present embodiment, and a copy control register group MCR26 corresponding to the novel mechanism of the present embodiment in the same manner as described above.

Operation will be described using FIG. 2.

An ordinary processor first fetches an instruction from a designated or specified area on a cache 3 and brings it to the instruction queue 20 through a line L10. The instruction queue 20 successively transmits instructions to the instruction decoder 21 where they are decoded. If the required instruction does not exist in the cache 3, then the processor executes a process for fetching or obtaining an instruction from main storage through a line L16 and a processor bus 5.

In load system instructions, a register to be set as a stored destination and an address on the main storage to be set as a read origin or source are normally specified. When desired data exists in the cache 3, the corresponding data is stored in the specified register of the register group 23 through a line L14. If no desired data exists in the cache 3, then the processor attempts to search data for the outside of the processor through the line L16 and the processor bus 5. At this time, the processor makes a data read request to the main storage and checks for the cache of other processors through a snoop mechanism.

This processing will be explained with the processor shown in FIG. 2 as another processor.

When an address at a storage destination of desired data is sent to the processor through the processor bus 5, the cache 3 is searched through a line L17. If the data at the corresponding address is held in the cache 3, then the data is written back to main storage banks 11 to 14 through the line L16 and the processor bus 5. At this time, the state of the corresponding data in the cache 3 will be regarded as [Invalid] (although the present data is also considered to be directly transmitted to a processor which desires data, a system for logically feeding back it to the main storage is adopted in the present embodiment).

On the other hand, the processor, which has executed the load system instructions, brings the data from the main storage to the cache 3 and the specified register of the register group 23 through the processor bus 5, line L16 and line L14. At this time, the state of the corresponding data in the cache 3 will be regarded as [occupy].

Similarly even in the case of store system instructions, a register to be set as a read source and an address on the main storage to be set as a storage destination are specified. Further, data on this register is stored in the cache 3 through the line L14. At this time, the state of the corresponding data in the cache 3 will be regarded as [change]. Simultaneously with this, the corresponding processor checks for caches in other processors through snoop processing.

This processing will be explained with the processor shown in FIG. 2 as another processor.

When an address on the main storage is sent to the processor through the processor bus 5, the cache 3 is searched through the line L17. If data at the corresponding address is held in the cache 3, then the state of the corresponding data in the cache will be regarded as [Invalid].

In the case of an operation instruction, one or a plurality of registers in the register group 23 are specified and an arithmetic operation is performed by an operator in the operator group 24. Data indicative of the result of operation at this time is stored in the specified register in the register group 23.

A copy of data on the main storage will next be described. The copy of the data on the main storage is executed as follows. A copy control register MCR26 is used for this processing.

In the present embodiment, a plurality of copy control registers MCR26 can be specified. Further, one copy control register MCR26 comprises the following four parts.

The first part holds a leading address at a transfer source on the main storage therein (see 26-1 in FIG. 2).

The second part holds a leading address at a transfer destination on the main storage therein (see 26-2 in FIG. 2).

The third part holds a transfer data length therein (see 26-3 in FIG. 2). Here, the transfer data length has a length less than or equal to 4 KB corresponding to a page size.

The fourth part holds the result of completion therein (see 26-4 in FIG. 2).

The copy of data on the main storage executes the following four-step procedures.

(1) A leading address (logical address) at a transfer source on the main storage, specified by an instruction is converted into a physical address by the address translator 22, after which it is set to the first part (26-1) of the copy control register MCR26.

(2) A leading address (logical address) at a transfer destination on the main storage, specified by an instruction is converted into a physical address by the address translator 22, after which it is set to the second part (26-2) of the copy control register MCR26.

(3) The transfer data length is set to the third part (26-3) of the copy control register MCR26.

(4) Information of (1) to (3) are sent out to a storage control unit 6 through lines L20 to L22 and the processor bus 5 to start up the storage control unit 6.

Since the contents of MCR26-1 and MCR26-2 are the physical addresses, they cannot be spread across page boundaries. Thus, when a transfer-source address and a transfer-destination address are both set to a page boundary, a designable transfer data length can be set to 4 KB at maximum. However, when at least one of them does not coincide with the page boundary, small one of their distances to the next 4 KB boundary, of the two physical addresses results in the settable maximum transfer data length (A second embodiment to be described later is limited to the case in which the transfer source address and the transfer destination address are both set to the page boundary).

Since a plurality of sets of copy control registers MCR26 are prepared, the repetitive execution of the processes of (1) to (3) allows the execution of large amounts of data copies with efficiency.

On the other hand, a report about the completion of a data copy on the main storage includes the following two methods.

(1) The storage control unit 6 sets an ending flag to the fourth part (26-4) of the copy control register MCR26 through the processor bus 5 and a line L23. The corresponding processor polls whether the ending flag is set to the fourth part (26-4) of the MCR26.

(2) An external interruption is produced from the storage control unit 6. The processor can accept the completion report in response to this interrupt processing.

Even in the case of the data copy on the main storage, the snoop processing is used to check caches on other processors. The difference between the load system process and store system process is that the transfer data length is arbitrarily set upon the data copy. It is thus necessary to check for the caches with respect to a plurality of addresses determined from information about the leading address and the transfer data length.

This processing will be explained with the processor shown in FIG. 2 as another processor other than those which execute the data copies. At this time, pieces of information about a leading address of a transfer source, a leading address of a transfer destination and a transfer data length are transmitted through the processor bus 5 and thereafter held in registers 27-1 to 27-3 in the address generator 25 for snoop processing through lines L24 to L26. Further, the address generator 25 generates address information to be searched for the cache 3 and writes back data from the cache 3 to the main storage banks 11 to 14 through the line L16 as needed to thereby perform a process for invalidating the corresponding address in the cache 3. When all the processes are completed, the processor reports the completion of snoop processing to the storage control unit 6 through lines L18 and L19 and the processor bus 5.

Figure 3:
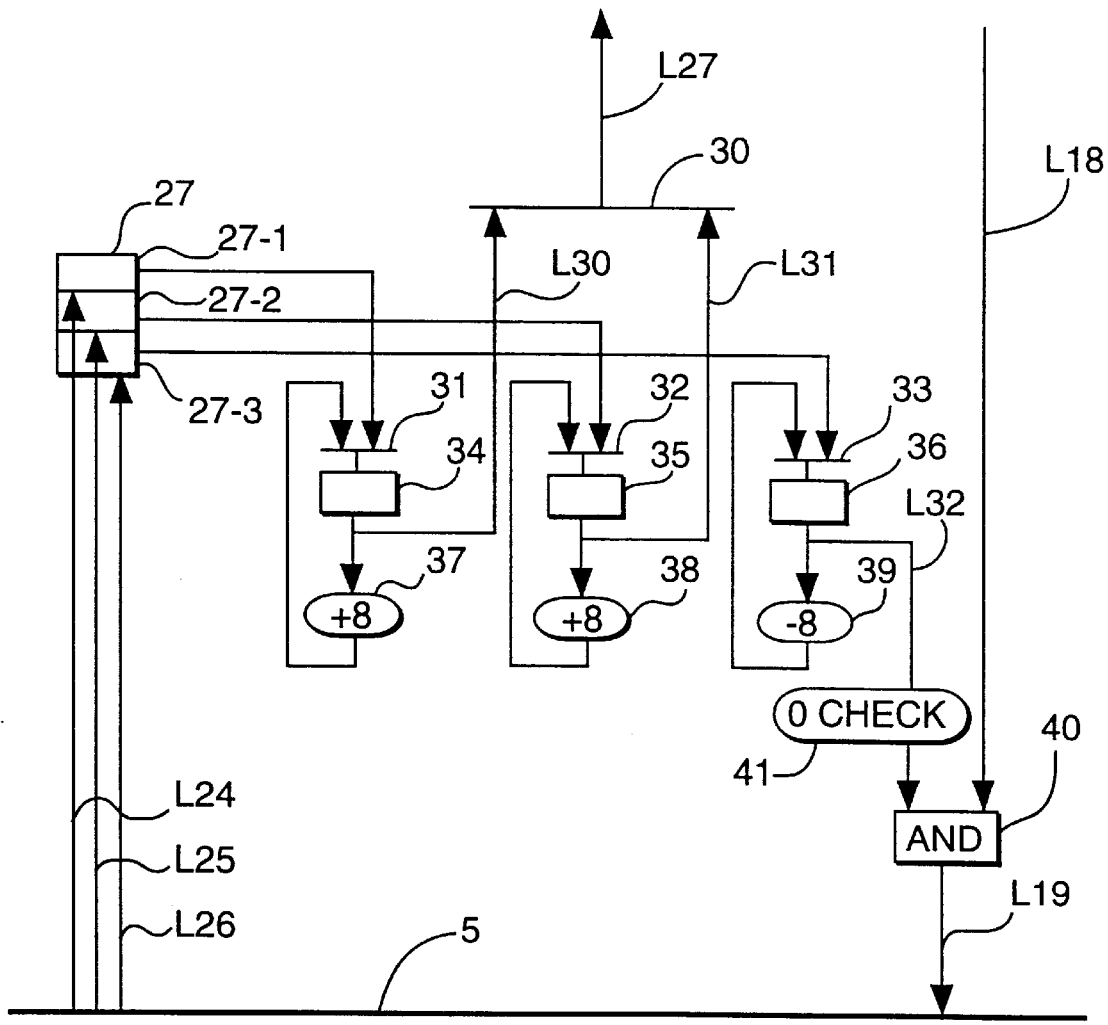
FIG. 3 is a diagram depicting a configuration of a cache address generator for performing snoop processing.

FIG. 3 shows a configuration of the address generator 25 for the snoop processing.

In FIG. 3, the address generator 25 comprises a register group 27 for holding therein pieces of information about a leading address of a transfer source, a leading address of a transfer destination and a transfer data length for performing each data copy on the main storage, selectors 30 to 33, registers 34 to 36, +8 (bytes) adders 37 and 38, a −8 (bytes) adder 39, an AND circuit 40, and a 0-check circuit 41.

The information about the leading address of the transfer source, the leading address of the transfer destination and the transfer data length sent through the processor bus 5 are held in their corresponding registers 27-1 to 27-3 through the lines L24 to L26. At this time, the selectors 31 to 33 are set so as to select the information held in the registers 27-1 to 27-3 as inputs, whereby the information held in the registers 27-1 to 27-3 are respectively brought to the registers 34, 35 and 36. The information brought to the registers 34 and 35 are transmitted to the corresponding cache through lines L30 and L31, the selector 30 and the line L27. The selector 30 successively perform switching so as to output the information held in the registers 34 and 35.

When the leading address of the transfer source held in the register 34 is sent to the line L27, it is handled in a manner similar to the load system process. Thus, the cache 3 is searched through the line L27. If data at the corresponding address is held in the cache 3, then the data is written back to the main storage banks 11 to 14 through the line L16 and the processor bus 5 to thereby set the state of the corresponding data as [Invalid].

On the other hand, when the leading address of the transfer destination held in the register 35 is transmitted to the line L27, it is handled in a manner similar to the store system process. Accordingly, the cache 3 is snooped through the line L27. If data at the corresponding address is held in the cache 3, then the state of the corresponding data in the cache 3 is set as [Invalid].

The contents of the registers 34 and 35 are updated by 8 bytes indicative of the unit of data each time a check for the cache is terminated. This continues until the value of the register 36 reaches 0. While the cache check is performed every 8 bytes in the present embodiment, several addresses may collectively be transmitted to check for the cache (no cache block is considered for simplicity in the present embodiment of course, it may be considered).

The 0-check circuit 40 makes a decision as to the value of the register 36. If the value thereof reaches 0 and the termination of the check for the cache is reported from the cache 3 through the line L18, then the address generator 25 reports the completion of the snoop processing to the storage control unit 6 through the line L19 and the processor bus 5.

It is here to be noted that a region or area to be copied on the main storage is required to be taken into consideration as software so as to avoid a touch thereof by other processors. Snoop processing at this time is performed to insure a sequence control operation to the utmost. Accordingly, it is also considered that all the sequence assurance is ensured by software and the snoop processing is not performed by hardware. It is also considered as one proposal that if allowed on architecture, an area to be subjected to copy processing is specified as a cacheless (non-caching) area to thereby make it unnecessary to perform the sequence assurance by the snoop processing.

The storage control unit 6 will next be described with reference to FIG. 4.

Figure 4:
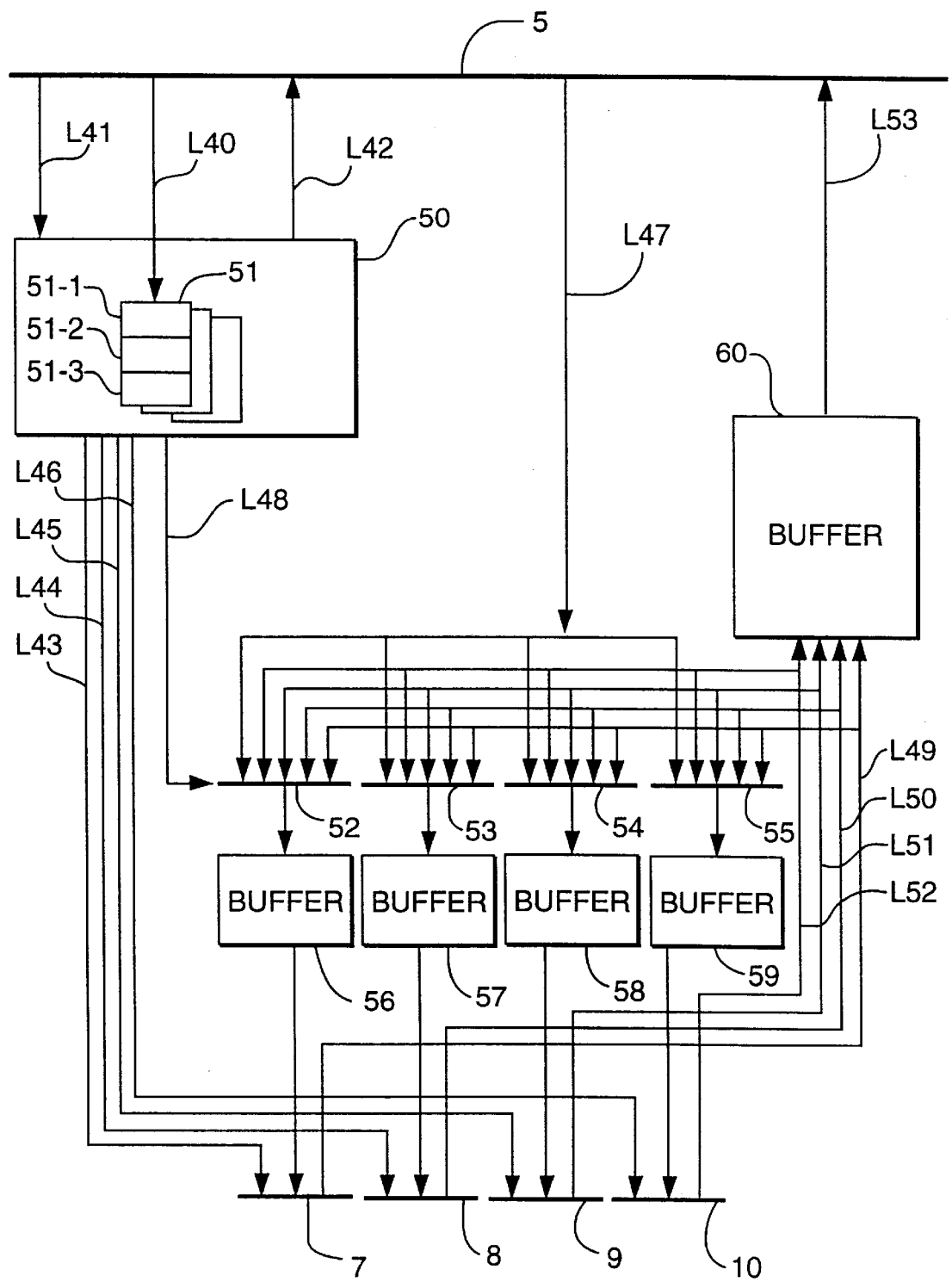
FIG. 4 is a diagram showing a configuration of a storage control unit employed in the first embodiment of the present invention.

In FIG. 4, the storage control unit 6 comprises a controller 50, registers 51 for respectively holding therein pieces of information about a leading address of a transfer source, a leading address of a transfer destination and a transfer data length for performing copy processing on the main storage, selectors 52 to 55, and buffers 56 to 60. Further, the storage control unit 6 is electrically connected to a processor bus 5 and main storage bank-buses 7 to 10.

A description will first be made of a normal load system process.

Read instructions and addresses thereof generated from the controller 50 are transmitted to the main storage bank-buses 7 to 10 through lines L43 to L46. Data read from main storage banks according to the read instructions are stored in the buffer 60 through lines L49 to L52 from the main storage bank-buses 7 to 10. Further, the data is sent out to a processor having executed a load system instruction, through a line L53 according to the state of the processor bus 5.

With respect to the store system processing, data transmitted from the processor through the processor bus 5 and a line L47 are respectively selected by the selectors 52 to 55 under the control of the controller 50, after which they are stored in their corresponding buffers 56 to 59 connected to the main storage bank-buses 7 to 10. Further, addresses at store positions are specified by the controller 50 through the lines L43 to line L46 and the stored data are sent out from the buffer 56 to 59 to the predetermined main storage bank-buses 7 to 10.

The copy of data on the main storage will next be described.

The controller 50 first brings a leading address of a transfer source, a leading address of a transfer destination and a transfer data length indicative of information necessary for the data copy on the main storage to the registers 51 through the processor bus 5 and a line L40. Next, the controller 50 receives reports about the completion of snoop processing from other processors therein through a line L41. The data copy can be started according to the reports.

The procedure of the data copy will be explained below.

(1) Read-source addresses on the main storage banks, which are generated from the controller 50, are transmitted to the main storage banks through the lines L43 to L46 and the main storage bank-buses 7 to 10. The data corresponding to the numbers specified by the controller 50 are read from the main storage banks to the lines L49 to L52 through the main storage bank-buses 7 to 10.

(2) The controller 50 calculates the corresponding relationship between a main storage bank corresponding to a read source and a main storage bank corresponding to a write destination. According to the result of calculation, the controller 50 performs switching between the selectors 52 to 55 through the line L48 to take the data on the lines L49 to L52 in the buffers 56 through 59 respectively.

(3) Write-destination addresses on the main storage banks, which are generated from the controller 50, are transmitted to their corresponding main storage banks through the lines L43 to L46 and the main storage bank-buses 7 to 10. Thus, the data corresponding to the numbers specified by the controller 50 are written from the buffers 56 to 59 to their corresponding main storage banks through the main storage banks-buses 7 to 10.

(4) The processes of (1) to (3) are repeatedly performed by the amount of data shown in a transfer data length held in a register 51-3.

(5) The controller 50 gives a completion report to each processor through the line L42 and the processor bus 5. Namely, the controller 50 writes a flag indicative of the completion of a data copy to the copy control register MCR26-4.

Figure 5:
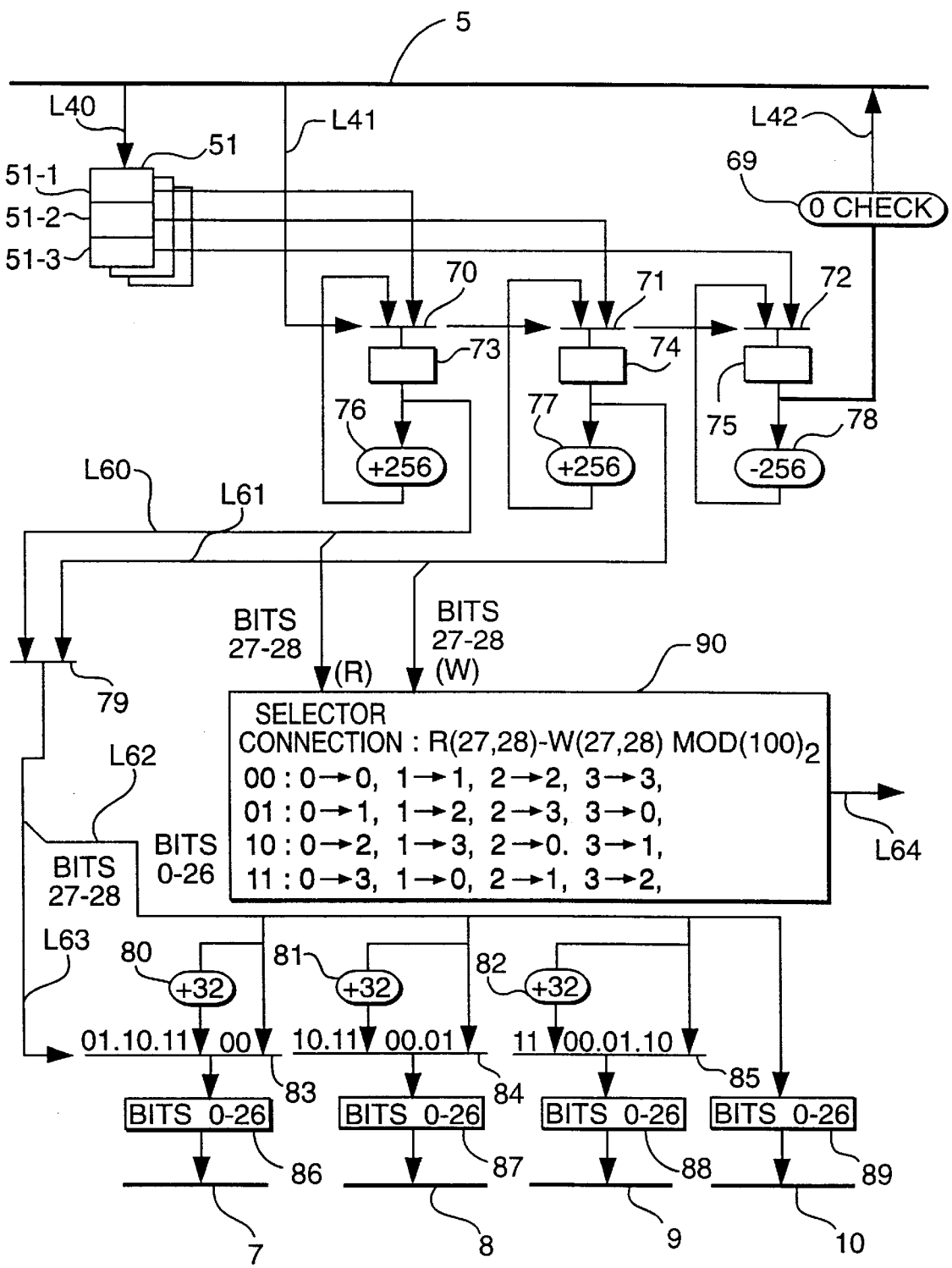
FIG. 5 is a diagram illustrating a configuration of a controller employed in the first embodiment of the present invention.

FIG. 5 is a diagram showing a configuration of the controller 50.

In FIG. 5, the controller 50 comprises registers 51 for respectively holding information about a leading address of a transfer source, a leading address of a transfer destination and a transfer data length used to perform copy processing on the main storage, a 0-check circuit 69, selectors 70 to 72, registers 73 to 75, +256 (bytes) adders 76 and 77, a −256 (bytes) adder 78, selectors 79 and 83 and 84, +32 (bytes) adders 80 to 82, and registers 86 to 89. Further, reference numeral 90 indicates mapping information in main storage banks corresponding to transfer sources and main storage banks corresponding to transfer destinations, which are implemented by controlling the selectors 52 to 55.

The information about the leading address of the transfer source, the leading address of the transfer destination and the transfer data length used to perform the copy of data on the main storage, which have been transmitted via the processor bus 5 and the line L40, are temporarily held in each register 51. Next, a report about the completion of snoop processing, which has been transmitted from each of other processors through the processor bus 5 and the line L41, is set as a startup signal and the information held in the register 51 are transferred to their corresponding registers 73 to 75 from which main storage addresses for reading and writing are generated.

In the controller 50, the reading/writing of data from and to the main storage is repeatedly performed with 256 bytes as a unit. 256-byte data corresponds to eight 8-byte data every main storage banks. The eight 8-byte data correspond to a unit of burst at the time that consideration is given to the implementation of main storage in an EDO mode of an SDRAM or DRAM and the utilization of its burst mode. This value might differ or vary according to the property of the EDO mode of SDRAM or DRAM. Of course, if the buffers 56 to 59 can be sufficiently ensured, then the data may be divided in much larger units.

The following three procedures are now repeatedly performed until the value of the register 75 reaches 0.

(1) Read addresses from the respective main storage banks, which are generated by the register 73, i.e., high-order bits 0–26, and bits 27 and 28 are respectively transmitted to a line L62 and a line L63 through a line L60. The bits 27 and 28 on the line L63 are used as select signals to select the selectors 83 to 85 and 32B is added to the addresses on the line L62 as needed. The added addresses are transmitted to the registers 86 to 89 from which they are further transferred to the respective main storage bank-buses 7 to 10.

(2) Simultaneously, the bits 27 and 28 of the read addresses from the respective main storage banks, which are generated from the register 73, are transmitted to the mapping information 90 in the main storage banks corresponding to the transfer sources and the main storage banks corresponding to the transfer destinations through the line L60. Further, bits 27 and 28 for addresses to be written into the respective main storage banks, which have been generated by the register 74, are transmitted to the mapping information 90 through the line L61 in the same manner as described above. The mapping information 90 calculates a displacement between the leading addresses in the main storage bank corresponding to each transfer source and the main storage bank corresponding to the transfer destination and controls the selectors 52 to 55 with a signal to be sent to a line L64 as a select signal.

(3) The addresses to be written into the respective main storage banks, which have been generated by the register 74, i.e., high-order bits 0–26, and bits 27 and 28 are respectively transmitted to the line L62 and the line L63 through the line L61. The bits 27 and 28 on the line L63 are used as select signals to select the selectors 83 to 85, and 32B is added to the addresses on the line L62 as needed. The added addresses are transmitted to the registers 86 to 89 from which they are further transferred to the respective main storage bank-buses 7 to 10.

If the 0-check circuit 69 determines that the value of the register 75 has reached 0, then it reports the termination of data transfer processing to the corresponding processor through the L42 and the processor bus 5.

A second embodiment of the present invention will next be described in detail with reference to FIGS. 6 and 7.

In the second embodiment, data in a transfer-source area aligned by a page on the main storage is transferred to a transfer-destination area aligned by the page in the same manner. Such data copy processing is of importance to an application which handles massive-scale data like a database.

In this case, it is necessary to electrically connect the buffers 52 to 55, the buffer 60 and the main storage bank-buses 7 to 10 in the storage control unit shown in FIG. 4 to one another in the first embodiment. Further, a large number of data lines are required. It is thus desirable to implement the storage control unit with a single LSI in the first embodiment.

On the other hand, it can be implemented by using a plurality of relatively small-scale LSIs in the second embodiment.

The second embodiment is different from the first embodiment in the configuration of the storage control unit 6 shown in FIG. 1.

A configuration of a storage control unit 6 employed in the second embodiment will be explained with reference to FIGS. 6 and 7.

Figure 6:
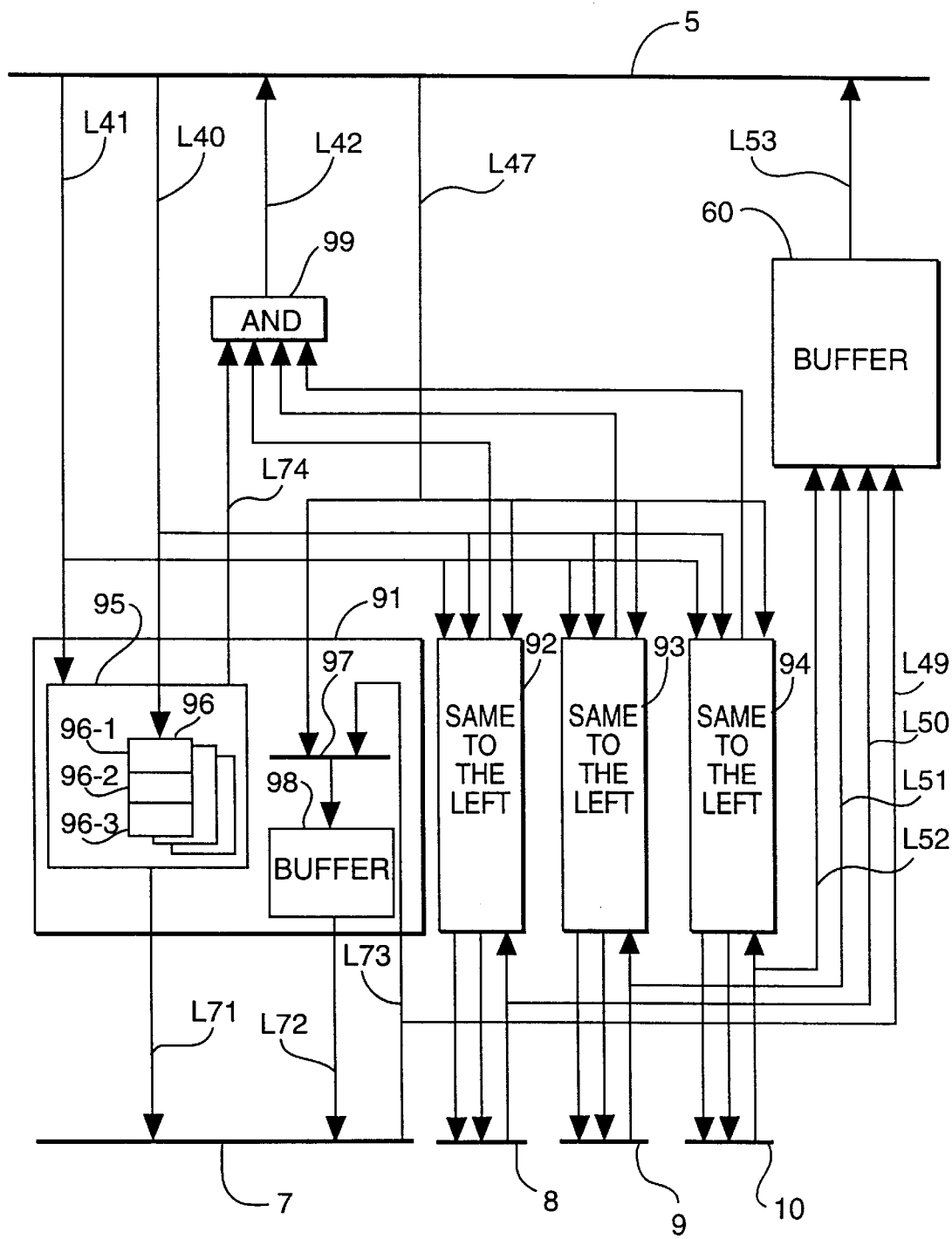
FIG. 6 is a diagram depicting a configuration of a storage control unit employed in a second embodiment of the present invention.

In FIG. 6, the storage control unit 6 comprises a sub storage control unit 91 connected to a main storage bank-bus 7, which comprises a controller 95, registers 96 for respectively holding therein information about a leading address of a transfer source, a leading address of a transfer destination and a transfer data length used to perform a process for copying data on the main storage, a selector 97 and a buffer 98, sub storage control units 92 to 94 identical to the sub storage control unit 91 in internal configuration and respectively electrically connected to main storage bank-buses 8 to 10, and an AND circuit 99 or the like.

The operation of the storage control unit 6 will be explained with reference to FIG. 6.

With respect to a normal load system process and a store system process, the same operation as the first embodiment is performed.

A data copy on the main storage will next be described.

Since the sub storage control units 91 to 94 perform similar operations respectively, the sub storage control unit 91 will be explained in the present embodiment.

Firstly, the sub storage control unit 91 brings a leading address of a transfer source, a leading address of a transfer destination and a transfer data length indicative of information necessary for the data copy on the main storage to the register 96 through a processor bus 5 and a line L40. Next, the sub storage control unit 91 receives reports about the completion of snoop processing from other processors through a line L41. The sub storage control unit 91 starts a data copy according to the reports.

The procedure of the data copy will be explained below.

(1) Read-source addresses on a main storage bank, which have been generated by the controller 95, are transmitted to the corresponding main storage bank through a line L71 and the main storage bank-bus 7. Data corresponding to the numbers specified by the controller 95 are read into a line L73 from the main storage bank, after which it is brought to the buffer 98 through the selector 97.

(2) Write addresses on the main storage banks, which have been generated by the controller 95, are transmitted to main storage banks through the line L71 and the main storage bank-bus 7. Further, data corresponding to the numbers specified by the controller 95 are written from the buffer 98 to main storage through the main storage bank-bus 7.

(3) The processes of (1) and (2) are repeatedly performed by the amount of data represented by a transfer data length held in a register 96-3.

(4) An end signal is sent from the sub storage control unit 91 to the AND circuit 99 through a line L74. End signals are transmitted to the AND circuit 99 even from other sub storage control units 92 to 94. When all the end signals are gathered thereat, the storage control unit 6 gives a termination report to the corresponding processor through the line L42 and the processor bus 5. Namely, the storage control unit 6 writes an ending flag into the copy control register MCR26 -4.

Figure 7:
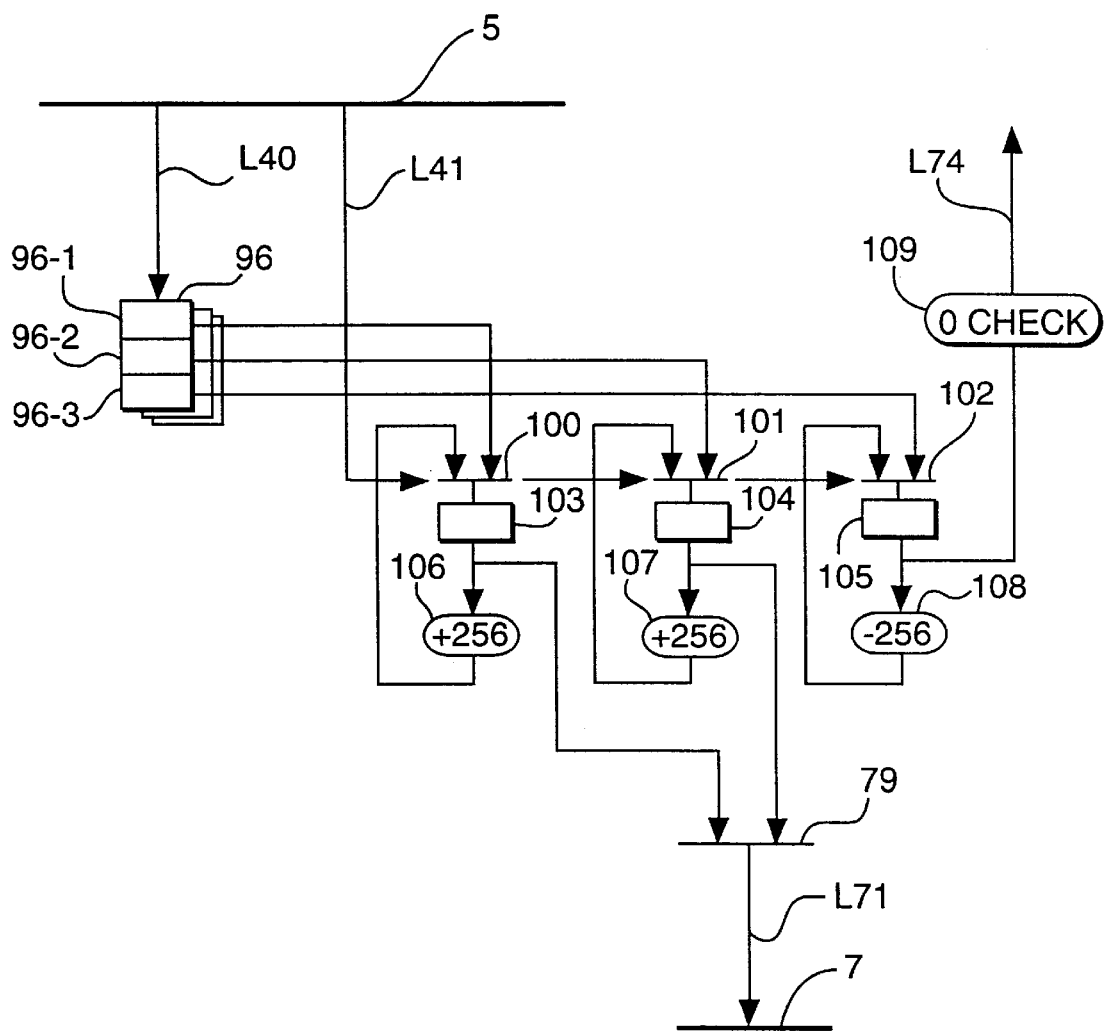
FIG. 7 is a diagram showing a configuration of a controller employed in the second embodiment of the present invention.

FIG. 7 is a diagram showing a configuration of the controller 95.

In FIG. 7, the controller 95 comprises a selector 79, registers 96 for respectively holding therein information about a leading address of a transfer source, a leading address of a transfer destination and a transfer data length used to copy data on the main storage, selectors 100 to 102, registers 103 to 105, +256 (bytes) adders 106 and 107, a –256 (bytes) adder 108, and a 0-check circuit 109.

The pieces of information about the leading address of the transfer source, the leading address of the transfer destination and the transfer data length used to copy the data on the main storage, which have been transmitted through the processor bus 5 and the line L40, are temporarily held in the register 96.

Next, a report about the completion of snoop processing, which has been transmitted from each of other processors through the processor bus 5 and the line L41, is used as a startup signal to transfer the information held in the register 51 to the registers 103 through 105, whereby main storage addresses for reading and writing are generated.

In the controller 95, the reading/writing of data from and to the main storage is repeatedly performed with 256 bytes as a unit. 256-byte data corresponds to eight 8-byte data every main storage banks. The eight 8-byte data correspond to a unit of burst at the time that the implementation of main storage in an EDO mode of an SDRAM or DRAM and the utilization of its burst mode are taken into consideration. This value might differ or vary according to the property of the EDO mode of SDRAM or DRAM of course, if the buffer 98 can be sufficiently ensured, then the data may be divided in much larger units.

The following two procedures are now repeatedly performed until the value of the register 105 reaches 0.

(1) A read address from the main storage bank, which has been generated by the register 103, is transferred to the main storage bank-bus 7 through the selector 79 and the line L71 to read data from each main storage bank.

(2) Next, an address to be written into the corresponding main storage bank, which has been generated by the register 104, is transferred to the main storage bank-bus 7 through the selector 79 and the line L71 to write data into the main storage.

If the 0-check circuit 109 determines that the value of the register 105 has reached 0, then it reports the termination of data transfer processing to the AND circuit 99 through the line L74.

While the present invention has been described above specifically by the illustrated embodiments, the present invention is not necessarily limited to the aforementioned embodiments. It is needless to say that various changes can be made thereto within the scope not departing from the substance of the invention.

According to the present invention, the following effects can be obtained.

(1) Since a data copy on the main storage can be performed in asynchronism with and independently of the processing of each processor, the load on the processor can be reduced.

(2) When the main storage is made up of a plurality of banks, a bottleneck in the data copy can be expanded from the capability of a processor bus to the total capability of main storage bank-buses.

(3) Since the processor bus may be unused in the data copy when a plurality of processors are connected to the processor bus, the load on the processor bus can be greatly reduced.

(4) Further, since data sent out from respective main storage banks are respectively held in the sub storage control units electrically connected to the main storage bank-buses corresponding to input sources in the second embodiment, the division of storage control units into LSI due to a limitation on the number of pins can be easily performed.

Further, since the respective sub storage control units can be easily implemented close to the respective main storage bank-buses, it is possible to reduce latency and shorten a clock frequency.

INDUSTRIAL APPLICABILITY

The present invention is suitable for use in a computer system having a configuration wherein one through a plurality of processors are connected to one another by a bus and main storage is shared between the respective processors.

What is claimed is:

1. A computer system, comprising:
   at least one processor;
   a main storage device; and
   a storage control unit for controlling access from said processor to said main storage device;
   said storage control unit including,
      transfer control means for holding therein address information in a first area of said main storage device, in which desired data specified by said processor is stored, address information in a second area of said main storage device, to which the desired data is to be transferred, and information about the length of the desired data, and
      transfer means for reading the desired data stored in the first area and storing the data in the second area under the control of said transfer control means,
   said storage control unit executing the transfer of data from the first area of said main storage device to the second area thereof independent of said processor according to instructions issued from said processor.

2. The computer system according to claim 1, wherein said processor has transfer instructing means which, in accordance with a command for providing instructions for the data transfer, holds therein the address information in the first area, the address information in the second area and the information about the data length and gives instructions about the held respective information to said storage control unit.

3. The computer system according to claim 2, wherein said transfer control means has transfer reporting means which determines whether the data transfer is completed and reports the completion of the data transfer to said processor when it is determined that the data transfer has been completed.

4. The computer system according to claim 3, wherein said transfer reporting means generates an interruption for said processor when it is determined that the data transfer has been terminated.

5. The computer system according to claim 3, wherein said transfer instructing means includes a completion holding unit for holding information about the completion of the data transfer therein, and said transfer reporting means sets the completion information to said completion holding unit.

6. A computer system, comprising:
   a plurality of processors;
   connecting means for connecting said plurality of processors to one another;
   a main storage device shared between said plurality of processors; and
   a storage control unit for controlling access from said plurality of processors to said main storage device;
   said storage control unit including,
      transfer control means for holding therein address information in a first area of said main storage device, which stores desired data specified by an arbitrary processor of said plurality of processors through said connecting means, address information in a second area of said main storage device, to which the desired data is to be transferred, and information about the length of the desired data, and
      transfer means for reading the desired data stored in the first area and storing the data in the second area under the control of said transfer control means, said storage control unit executing the transfer of data from the first area of said main storage device to the second area thereof independent of said each processor according to instructions from said arbitrary processor.

7. The computer system according to claim 6, wherein said transfer control means has a transfer holding unit for holding the respective information therein, and a generation unit for generating read and write addresses for the desired data in accordance with the respective information and controlling the reading of data from said main storage device and the writing of data therein, and said transfer means transfers data read from the first area to the second area under the control of said generation unit.

8. The computer system according to claim 6, wherein said each processor has transfer instructing means which, in accordance with a command for providing instructions for the data transfer, holds therein the address information in the first area, the address information in the second area and the information about the data length and gives instructions about the held respective information to said storage control unit through said connecting means.

9. The computer system according to claim 8, wherein said transfer control means has a transfer reporting unit for determining whether the data transfer is completed and reporting the completion of the data transfer to said arbitrary processor when it is determined that the data transfer has been completed.

10. The computer system according to claim 9, wherein said transfer instructing means includes a completion holding unit for holding information about the completion of the data transfer therein, and said transfer reporting unit sets the completion information to said completion holding unit of said arbitrary processor.

11. The computer system according to claim 8, wherein said each processor has a cache memory for holding a copy of some of the data stored in said main storage device, and cache searching means for holding the address information in the first area, the address information in the second area and the information about the data length indicated by another arbitrary processor and searching in accordance with the respective information whether copies of the data stored in the respective areas of said main storage device are held in said cache memory, and said transfer instructing means gives instructions on the respective information even to other processors through said connecting means when the instructions on the respective information are given to said storage control unit, whereas said cache searching means searches for said cache memory in accordance with the respective information when the instructions on the respective information are provided from other processors through said connecting means.

12. The computer system according to claim 11, wherein when the copies of the data stored in the respective areas of said main storage device are held in said cache memory, said cache searching means invalidates the data.

13. The computer system according to claim 11, wherein said cache searching means has a search reporting unit for determining whether a search for said cache memory is completed and reporting the completion of said cache search to said storage control unit when it is determined that the said se arch has been completed.

14. The computer system according to claim 13, wherein when said transfer control means receives said completion report from said each processor, said transfer control means allows said transfer means to start data transfer.

15. A computer system, comprising:
a plurality of processors;
connecting means for connecting said plurality of processors to one another;
at least two interleaved storage banks;
a main storage device shared between said plurality of processors; and
a storage control unit for controlling access from said plurality of processors to said main storage device,
said storage control unit including,
at least two sub storage control units having,
transfer control means for holding address information in a first area of said main storage device, in which desired data is stored, address information in a second area of said main storage device, to which the desired data is to be transferred, and information about the length of said desired data, said all information being instructed by an arbitrary processor of said plurality of processors through said connecting means every storage banks, and
transfer means for reading the desired data stored in the first area and storing the data in the second area under the control of said transfer control means,
said each sub storage control unit executing the transfer of data from the first area to the second area every said storage banks separately from said each processor according to instructions from said arbitrary processor.

16. The computer system according to claim 15, wherein said each processor has transfer instructing means which, in accordance with a command for providing instructions for the data transfer, holds therein the address information in the first area, the address information in the second area and the information about the data length and gives instructions about the held respective information to said each sub storage control unit through said connecting means.

17. The computer system according to claim 15, wherein said transfer control means of said each sub storage control unit has a first transfer reporting part for determining every said storage banks whether said data transfer is completed, and reporting the completion of said data transfer when it is determined that said data transfer has been completed, and said storage control unit has a second transfer reporting part for receiving reports on the completion of the data transfer from the respective transfer reporting parts of said respective sub storage control units and reporting the completion of said data transfer to said arbitrary processor when the reports on the completion of said data transfer are received from all of said transfer reporting parts.

18. The computer system according to claim 17, wherein said transfer instructing means includes a completion holding unit for holding information about the completion of the data transfer therein, and said second transfer reporting part sets the completion information to said completion holding unit of said arbitrary processor.

* * * * *